United States Patent
Chen et al.

(10) Patent No.: US 11,069,130 B2
(45) Date of Patent: Jul. 20, 2021

(54) GENERATING THREE-DIMENSIONAL VIRTUAL SCENE

(71) Applicant: INTERNATIONAL BUSINESS MACHINES CORPORATION, Armonk, NY (US)

(72) Inventors: Hao Chen, Beijing (CN); Guo Qiang Hu, Shanghai (CN); Qi Cheng Li, Beijing (CN); Li Jun Mei, Beijing (CN); Jian Wang, Beijing (CN); Yi Min Wang, Beijing (CN); Zi Yu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 13/691,033

(22) Filed: Nov. 30, 2012

(65) Prior Publication Data

US 2013/0135304 A1 May 30, 2013

(30) Foreign Application Priority Data

Nov. 30, 2011 (CN) .......................... 201110391339.5

(51) Int. Cl.
*G06T 17/00* (2006.01)
*G06T 19/20* (2011.01)

(52) U.S. Cl.
CPC .............. *G06T 17/00* (2013.01); *G06T 19/20* (2013.01); *G06T 2210/61* (2013.01); *G06T 2219/2004* (2013.01); *G06T 2219/2016* (2013.01)

(58) Field of Classification Search
CPC ......... G06T 2210/61; G06T 2219/2004; G06T 2219/2016
See application file for complete search history.

(56) References Cited

U.S. PATENT DOCUMENTS 5,701,403 A * 12/1997 Watanabe ............... G06T 17/10
345/419
6,671,701 B1 * 12/2003 Chouinard ........ G06F 17/30569
(Continued)

FOREIGN PATENT DOCUMENTS

CN     101114385 A     1/2008
CN     101303773 A    11/2008
(Continued)

OTHER PUBLICATIONS

Chan, M., et al. "Physics-Based Tracking of 3D Objects in 2D Image Sequences" Proceedings of the 12th IAPR International Conference on Pattern Recognition, vol. 1—Conference A: Computer Vision & Image Processing. Oct. 1994. pp. 1-5.
(Continued)

*Primary Examiner* — Jennifer Mehmood
*Assistant Examiner* — Jed-Justin Imperial
(74) *Attorney, Agent, or Firm* — Tutunjian & Bitetto, P.C.; Vazken Alexanian

(57) ABSTRACT

A method and system for generating a three-dimensional (3D) virtual scene are disclosed. The method includes: identifying a two-dimensional (2D) object in a 2D picture and the position of the 2D object in the 2D picture; obtaining the three-dimensional model of the 3D object corresponding to the 2D object; calculating the corresponding position of the 3D object corresponding to the 2D object in the horizontal plane of the 3D scene according to the position of the 2D object in the picture; and simulating the falling of the model of the 3D object onto the 3D scene from a predetermined height above the 3D scene, wherein the position of the landing point the model of the 3D object in the horizontal plane is the corresponding position of the 3D object in the horizontal plane of the 3D scene.

20 Claims, 6 Drawing Sheets

(56) References Cited

U.S. PATENT DOCUMENTS

| | | | |
|---|---|---|---|
| 6,677,944 B1* | 1/2004 | Yamamoto | G06T 17/00 345/422 |
| 7,043,695 B2 | 5/2006 | Elber et al. | |
| 2002/0095439 A1* | 7/2002 | Long et al. | 707/507 |
| 2007/0156625 A1* | 7/2007 | Visel | 706/62 |
| 2008/0211809 A1* | 9/2008 | Kim | G06K 9/00697 345/420 |
| 2009/0066690 A1 | 3/2009 | Harrison | |
| 2009/0116732 A1 | 5/2009 | Zhou et al. | |
| 2009/0327899 A1 | 12/2009 | Bress et al. | |
| 2010/0045660 A1 | 2/2010 | Dettinger et al. | |
| 2010/0245352 A1 | 9/2010 | Chakraborty | |
| 2010/0268513 A1* | 10/2010 | Loberg | 703/1 |
| 2010/0299121 A1 | 11/2010 | Bond et al. | |
| 2010/0315413 A1 | 12/2010 | Izadi et al. | |
| 2011/0043540 A1 | 2/2011 | Fancher et al. | |
| 2011/0134109 A1 | 6/2011 | Izumi | |
| 2011/0191365 A1 | 8/2011 | Betzler et al. | |

FOREIGN PATENT DOCUMENTS

| | | |
|---|---|---|
| CN | 101536040 A | 9/2009 |
| CN | 101930627 A | 12/2010 |

OTHER PUBLICATIONS

Li, C., et al. "Automatic 3D Scene Generation Based on Maya" IEEE 10th International Conference on Computer-Aided Industrial Design & Conceptual Design, 2009. CAID & CD 2009. Nov. 2009. (1 Page) (Abstract Only).

Zeng, X., et al. "3D Scene Creation Using Story-Based Descriptions" Proceedings of CGAIMS'2005. Jul. 2005. pp. 74-80.

Yuan, C. "Using Large-Size 2D Displays to Create 3D Hyper-Realistic See-Through Experiences" Proc. of 16th International Display Workshops. Dec. 2009. (5 Pages)(including 1 sheet from corresponding PowerPoint presentation).

* cited by examiner

GENERATING THREE-DIMENSIONAL VIRTUAL SCENE

TECHNICAL FIELD

The present invention relates to virtual world applications and, in particular, to the creation of three-dimensional virtual scene in virtual world applications.

BACKGROUND

In applications such as virtual worlds, video games, etc., it is needed to generate a huge amount of three-dimensional virtual scenes (or "3D scenes"). Existing technologies typically rely on the 3D graphics based applications to manually generate 3D scenes. Manual generation of a 3D scene is a process in which the user configures 3D objects (i.e. virtual objects in the 3D scene) in the 3D scene, wherein the user is required to select models of the 3D objects, and use input devices such as the mouse to insert the selected models of the 3D objects, one by one, into the desired position in the 3D scene.

Manual generation of 3D scenes in this way requires the user to insert models of 3D objects into a 3D scene one by one. Moreover, in the case of dense 3D objects in the 3D scene, some positions are easily shielded by existing 3D objects in the 3D scene due to the operator's angle of view, leading to the operator's difficulty in accurately inserting a model into a desired position.

SUMMARY

One of the objects of the present invention is to simplify the operation needed for the user by an improved way of 3D scene generation.

In one aspect, there is provided a method for generating a three-dimensional (3D) virtual scene, comprising: identifying a two-dimensional (2D) object in a 2D picture and the position of the 2D object in the 2D picture; obtaining the three-dimensional model of the 3D object corresponding to the 2D object; calculating the corresponding position of the 3D object corresponding to the 2D object in the horizontal plane of the 3D scene according to the position of the 2D object in the picture; and simulating the falling of the model of the 3D object onto the 3D scene from a predetermined height above the 3D scene, wherein the position of the landing point of the model of the 3D object in the horizontal plane is the corresponding position of the 3D object in the horizontal plane of the 3D scene.

In another aspect, an apparatus is provided for generating a three-dimensional (3D) virtual scene, comprising: a 2D object identifying device, configured to identify a two-dimensional (2D) object in a 2D picture and the position of the 2D object in the 2D picture; a model acquiring device, configured to obtain the three-dimensional model of a 3D object corresponding to the 2D object; a position mapping device, configured to calculate the corresponding position of the 3D object corresponding to the 2D object in the horizontal plane of the 3D scene according to the position of the 2D object in the picture; and a simulation device, configured to simulate the falling of the model of the 3D object onto the 3D scene from a predetermined height above the 3D scene, wherein the position of the landing point the model of the 3D object in the horizontal plane is the corresponding position of the 3D object in the horizontal plane of the 3D scene.

BRIEF DESCRIPTION OF THE DRAWINGS

In conjunction with the drawings and with reference to the following detailed description, features, advantages, and other aspects of embodiments of the present invention will become more apparent from the several embodiments of the present invention shown in exemplary rather than limiting manner. In the drawings.

DETAILED DESCRIPTION

Figure 1:
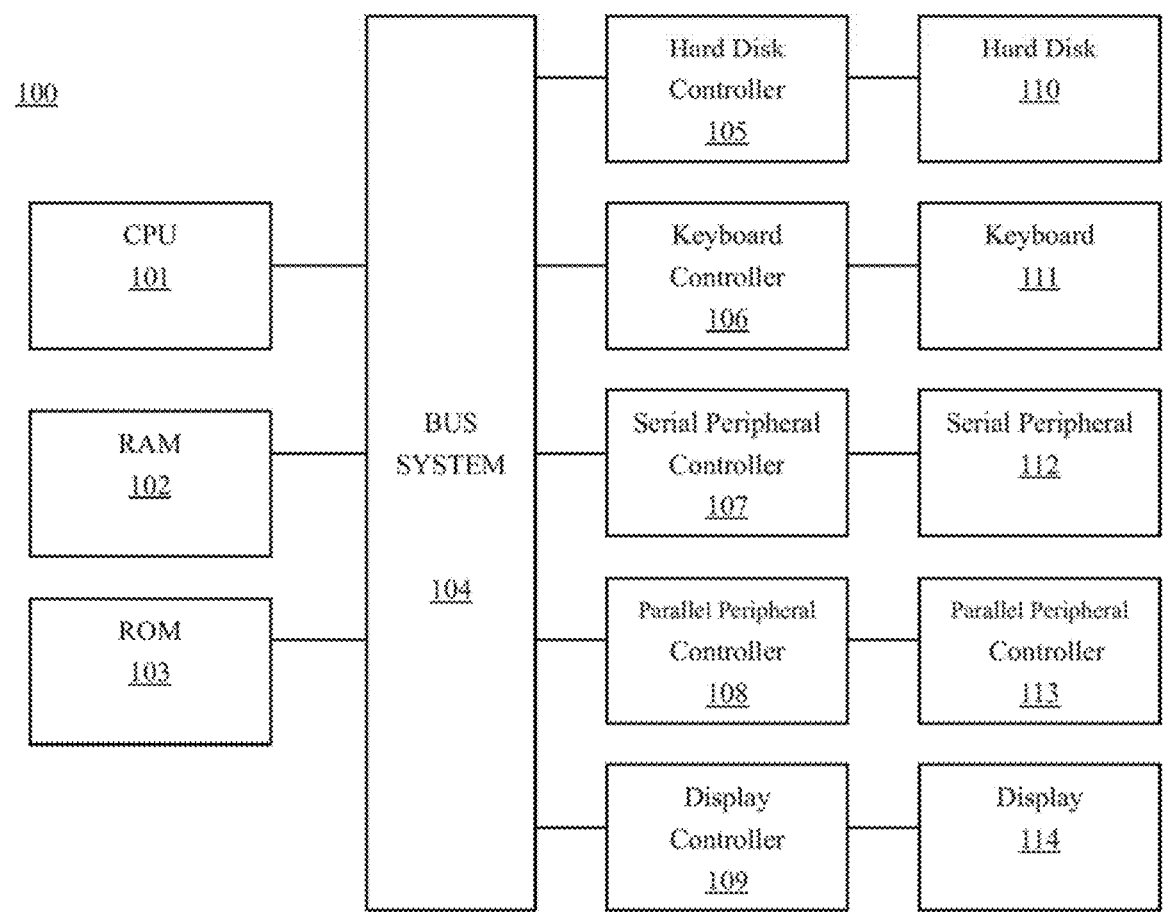
FIG. 1 shows a block diagram of an exemplary computing system 100 adapted to be used to implement various embodiments of the present invention.

The flowcharts and blocks in the figures illustrate the system, methods, as well as architecture, functions and operations executable by a computer program product according to embodiments of the present invention. In this regard, each block in the flowcharts or block may represent a module, a program segment, or a part of code, which contains one or more executable instructions for performing specified logic functions. It should be noted that, in some alternative implementations, the functions noted in the blocks may also occur in a sequence different from what is noted in the drawings. For example, two blocks shown consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

Hereinafter, the principle and spirit of the present invention will be described with reference to various exemplary embodiments. It should be understood that provision of these embodiments is only to enable those skilled in the art to better understand and further implement the present invention, not intended for limiting the scope of the present invention in any manner.

FIG. 1 shows a block diagram of an illustrative computing system 100 that is adapted to implement embodiments of the present invention. The computing system 100 shown in FIG. 1 comprises a CPU (central processing unit) 101, a RAM (random access memory) 102, a ROM (read-only memory) 103, a system bus 104, an hard disk controller 105, a keyboard controller 106, a serial interface controller 107, a parallel interface controller 108, a display controller 109, a hard disk 110, a keyboard 111, a serial peripheral 112, a parallel peripheral 113 and a display 114. Among these components, connected to the system bus 104 are the CPU 101, the RAM 102, the ROM 103, the hard disk controller 105, the keyboard controller 106, the serial interface controller 107, the parallel controller 108 and the display controller 109. The hard disk 110 is connected to the hard disk controller 105; the keyboard 111 is connected to the keyboard controller 106; the serial peripheral 812 is connected to the serial interface controller 107; the parallel peripheral 113 is connected to the parallel interface controller 108; and the display 114 is connected to the display controller 109. It should be understood that the structural block diagram in FIG. 1 is shown only for illustration purposes, and is not intended to limit the scope of the present invention. In some cases, some devices may be added or reduced as needed. For example, a network adapter may be configured for the computing system 100 so as to have the capacity of accessing computer networks.

Before describing various embodiments of the present invention, an example of manually generating a three-dimensional virtual scene in the prior art is described first.

Figure 2:
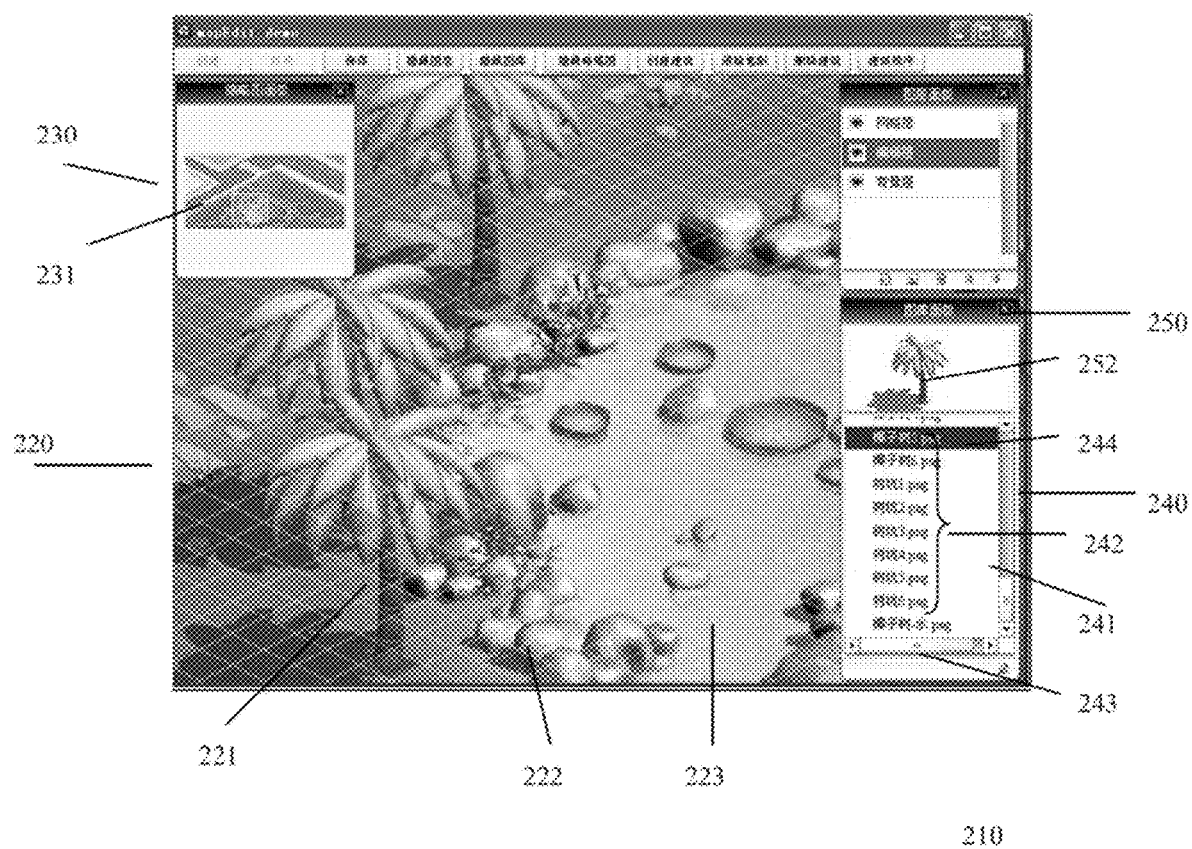
FIG. 2 schematically shows a tool of the prior art for manual generation of 3D scenes.

Referring to FIG. 2, a tool schematically shows manual generation of 3D scenes.

The tool for generation of 3D scenes as shown in FIG. 2 is depicted as a graphical user interface 210. A user may operate on the graphical user interface via an input device (not shown) to insert virtual objects into a 3D scene.

A 3D scene, also called "virtual scene", is a group composed of 3D objects. A 3D scene may also be used as the basic unit to construct another 3D scene. For example, a number of trees as 3D objects can constitute a 3D virtual forest. By the 3D virtual forest and a mountain as a 3D object, yet another 3D scene may be further constructed.

A 3D object is a type of virtual object in a 3D scene, such as hills, trees, rocks, lakes, boats, human figures. A 3D object can be used as the basic unit to construct 3D scenes.

There may be a number of 3D models for a 3D object. A 3D model is a three-dimensional graphic of a 3D object, defined by a computer-readable file, and is also called "object model" or simply "model". 3D generating tools already existing in the prior art, such as "3DMax", may be used to create 3D models for a 3D object, and the created 3D models may be saved within a database. The database in which 3D models are saved is referred to as "model database". For example, a number of three-dimensional graphics may be created for a 3D object "tree" and they are then stored in a model database in association with the 3D object "tree".

Turning to FIG. 2, on the left side of the graphical user interface 210, the image denoted by the reference mark 220 shows a 3D scene.

The 3D scene 220 might be empty at the beginning. After a period of time of editing, at the current moment as shown, the 3D scene 220 has placed therein a number of virtual objects, for example, coconut trees 221, rocks 222 and water 223.

In the graphical user interface, there is also depicted another 3D scene 230. In the 3D scene 230, a thumbnail indicated by reference mark 231 shows the 3D scene 220. That is to denote that the 3D scene 220 is a part of the 3D scene 230.

On the right side of the graphical user interface 210, it is displayed a list window 240 and an image library panel 250.

The list window 240 contains a vertical scroll bar 241, a horizontal scroll bar 243 and a list of file names 242.

Each item 244 in the list of file names 242 is a file name representing a file that describes a 3D model. The user may use the mouse to manipulate the vertical scroll bar 241 and horizontal scroll bar 243 to display the content of the list 242.

When the user uses the mouse pointer to point to a file name in the list 242, the file name is highlighted and, at the same time, in the image library panel 250 the graphics 252 of the 3D model corresponding to the file name is displayed.

A number of file names in the current list 242 in the list window 240 represent a number of files of 3D models that describe the 3D object "tree". The 3D models in the 3D model list 240 have been generated in advance and stored in a 3D model database. A variety of 3D models may be stored in the 3D model database.

The graphical user interface 210 may provide an input field (not shown) for the user to input a search term so as to retrieve the desired 3D model. For example, the user inputs the search term "tree". In response, the list 242 is displayed in the list window 240. If the user moves the mouse pointer over a file name 244 in the list 242, the file name is highlighted and, at the same time, the graphics or model 252 corresponding to the file name is displayed in the image library panel 250, which is a coconut tree graphic. If the user wants to place the model 252 in the 3D scene 220, the user could "select" the model 252 with the mouse, "drag" it to a desired position in the 3D scene 220 and then put place down there. In this way, a virtual object, such as the coconut tree 221, is placed in the position.

Repeating such operation as described above, 3D models may be placed one by one to the 3D scene 220.

After 3D models are placed in the 3D scene, adjustment may be conducted for the 3D models in the 3D scene, such as inversion, zooming and position moving, until the 3D scene is satisfactory.

Such a way of operation by placing virtual objects one by one into the 3D scene is relatively straightforward, but it is inefficient and sometimes inconvenient. For example, in the case of dense 3D objects in the 3D scene, some positions in the 3D scene are likely to be obstructed by existing 3D objects (such as rocks, trees) due to the operator's angle of view. As a result, it is hard for the operator to accurately place a model at a desired position.

Therefore, the invention provides a method and system for generating a three-dimensional virtual scene. Now, with reference to FIGS. 3-7, embodiments of the invention will be described in detail.

Figure 3:
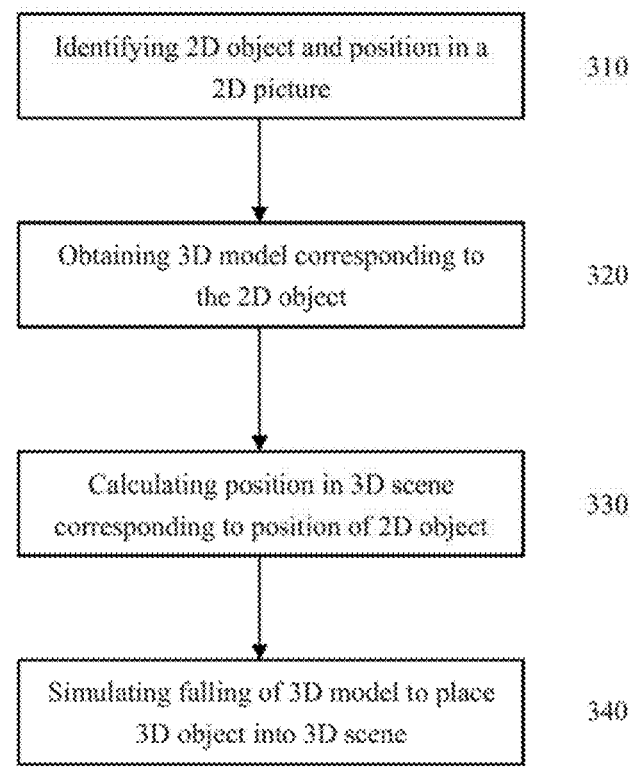
FIG. 3 is a flowchart of the method for generating a 3D scene in accordance with an embodiment of the present invention.

Refer first to FIG. 3, which is a flowchart of a method for generating a 3D scene according to an embodiment of the invention. The flowchart broadly describes the method of the embodiment in the following process: identifying a two-dimensional (2D) object in a 2D picture and the position of the 2D object in the 2D picture; obtaining the three-dimensional model of the 3D object corresponding to the 2D object; calculating the corresponding position of the 3D object corresponding to the 2D object in the horizontal plane of the 3D scene according to the position of the 2D object in the picture; and simulating the falling of the model of the 3D object onto the 3D scene from a predetermined height above the 3D scene, wherein the position of the landing point the model of the 3D object in the horizontal plane is the corresponding position of the 3D object in the horizontal plane of the 3D scene.

In one method, a simple 2D object on a two-dimensional map (also referred to as a "picture" hereinafter) is used to represent a virtual object to be placed in the 3D scene. By simulating free falling of the virtual object, a model of the virtual object represented by a 2D object on a picture may be placed into the 3D scene. Repeating the process of the above method for different pictures, more virtual objects may be placed in the 3D scene.

Operation of each of the steps of the above process is now described by way of example.

First, at Step 310, a 2D object in a 2D picture and the position of the 2D object in the 2D picture are identified.

Figure 4:
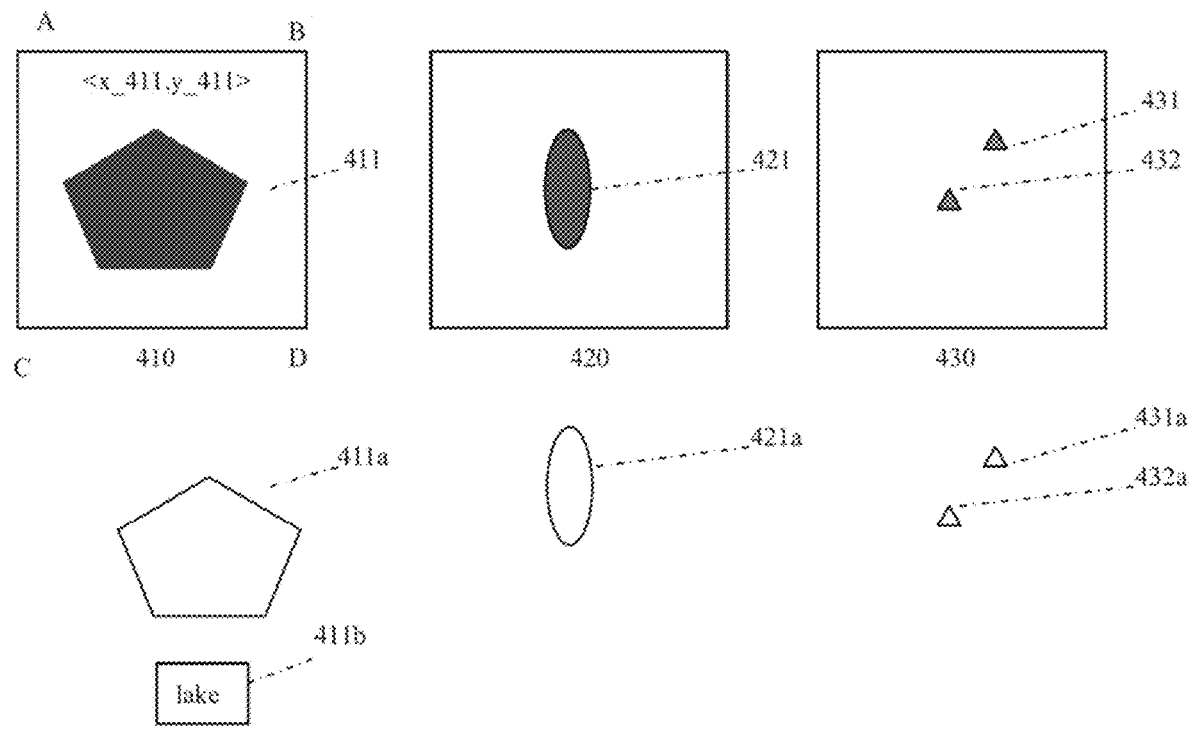
FIG. 4 schematically shows several pictures showing the layout of a 3D scene in accordance with an embodiment of the present invention.

A two-dimensional map is a picture generated by 2D graphics editing tools, and a 2D object is a two-dimensional image generated by 2D graphics editing tools, for example, color block, geometric shape and text block. A picture comprises one or more 2D objects in different positions, and each 2D object occupies a certain region on the picture. Pictures are used to represent the layout of the three-dimensional virtual scene. Therefore, the term "picture" is also called the "scene layout" or "SLM" (Scene Layout Map). FIG. 4 schematically shows several pictures in accordance with an embodiment of the invention.

As shown in FIG. 4, according to an embodiment of the present invention, the 2D objects contained in the picture are color blocks. For example, the pictures 410 and 420 respectively contains a color block in blue 411 and a color block in brown 421, and the picture 430 contains two color blocks in red 431 and 432.

In accordance with an embodiment of the invention, for a picture containing a 2D object which is a color block, said identifying a two-dimensional (2D) object in a 2D picture and the position of the 2D object in the 2D picture, in Step 310, comprises identifying a color block, the color of the color block and the position of the color block.

Those skilled in the art shall appreciate that a color block is composed of adjacent pixels of the same color. For any picture, the computer can recognize the color of each pixel by scanning each of the pixels in the picture. For example, by reading the pixel value of each pixel position in the picture, the color of each pixel can be recognized. Thereby, a set of adjacent pixels having the same color may be identified, i.e. a color block. The color of the color block is the color of each pixel in the set. A 2D object in a two-dimensional picture can thus be identified to be a color block.

There are different ways in which the position of the identified 2D object is denoted. For example, a set of coordinates of all pixels contained in a color block in the picture may be used to denote the position of the color block.

In accordance with an embodiment of the invention, the coordinates (x, y) of the geometric center of the color block in the picture may be calculated to represent the coordinates of the position of the color block in the picture.

Taking the picture 410 as an example, by Step 310, it may be identified that the picture 410 includes a blue color block 411. Assuming that the color block 411 contains n pixels, then a set of coordinates of the n pixels (<x1,y1>, <x2,y2>, . . . <xn,yn>) may be used to indicate the position the color block 411; or, the coordinates <x_411,y_411> of the geometric center of the color block 411 may be used to denote the position of the color block 411, wherein, x_411=(x1+x2+ . . . , Xn)/n, y_411=(y1+y2+ . . . yn)/n.

It should be noted that, if a picture contains multiple color blocks, Step 310 may also identify the multiple color blocks and the color and the position of each of the color blocks.

Figure 7:
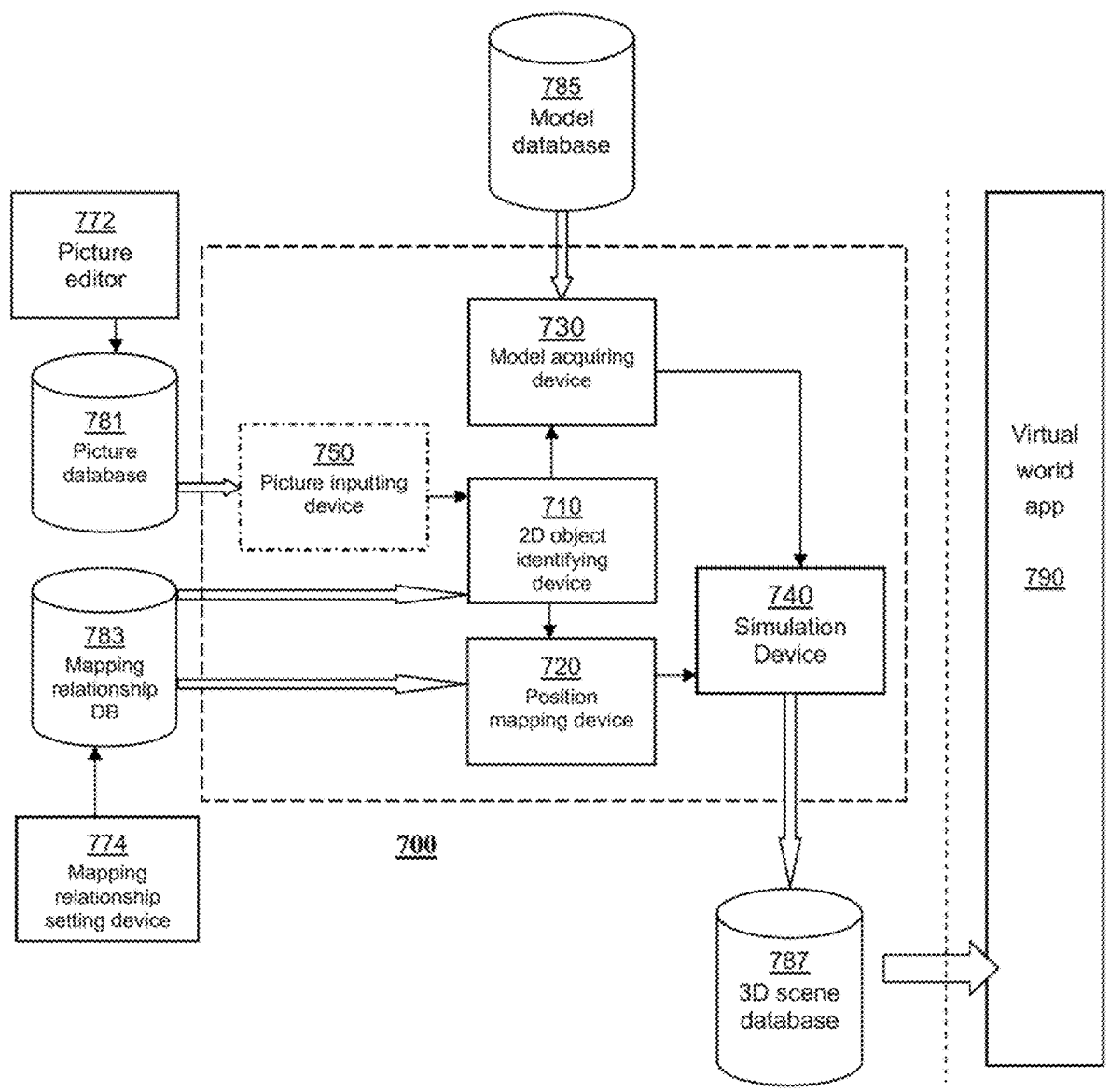
FIG. 7 is a block diagram of the apparatus for generating a 3D scene in accordance with an embodiment of the present invention.

The pictures shown in FIG. 4 may be generated using a picture editor 772 (FIG. 7). One example of such a picture editor is the drawing tool "MSPAINT provided by the Windows® operating system. MSPAINT provides such editing features as drawing a picture with a "brush" according to selected shape and size, and filling an area with a color. With the editing features provided by the drawing tool, color blocks 411,421,431, etc., may be drawn in a blank screen to result in the pictures as shown in FIG. 4.

In accordance with an embodiment of the invention, the picture as mentioned in Step 310 may be obtained directly from the output of the picture editor.

Of course, after a picture is created with the picture editor, the created picture may be stored in the format of a drawing file (such as a file with the suffix ".bmp"), for example, in a picture database 781 (FIG. 7). Accordingly, an embodiment of the invention may comprise reading from such a database (e.g., the picture database 781) a drawing file describing a picture, thereby obtaining the picture mentioned in Step 310.

According to an embodiment of the present invention, in implementing the invention, it is needed to repeatedly receive a plurality of pictures. In that case, it is needed to pre-set the sequential relationship among the pictures. For example, a number of file names of two-dimensional pictures are set in a list in accordance with a predetermined sequence. In the repeated execution of Step 310, the file names may be obtained from the list sequentially and then the drawing files are read with the obtained file names from the storage.

In the above description, it is assumed that the 2D objects contained in the pictures (for example, 410, 420 and 430) are color blocks. However, the invention is not limited to that. The 2D objects contained in a picture of the invention may be any graphics that can be individually recognized.

For example, the 2D object contained in the picture, in addition to color block, may also be geometric graphics or a block of text.

For example, the color block 411 in the picture 410 may be replaced with a pentagon 411*a*. The color block 421 in the picture 420 may be replaced with an oval 421*a*. And the color blocks 431 and 432 in the picture 430 may be respectively replaced with triangles 431*a* and 432*a*. Those in skilled in the art shall appreciate that such geometric graphics and color blocks contained in the picture and their position are all individually identifiable. For example, in Step 310, it may be identified that there is a pentagon included in the picture 410.

As another example, the color block 411 in the picture 410 may be replaced with a text block 411*b*. Those in skilled in the art shall appreciate that such geometric graphics and text blocks, and their position, are also individually identifiable. For example, in Step 310, it may be identified that there is a rectangular block containing the text content of "lake" in the picture 410. The color blocks 421, 431 and 432 may also be replaced with similar text blocks.

Generally, if the result of the execution of Step 310 is the identification of m 2D objects and their positions, the result may be expressed as a list of tuples $$(\langle OBJ1,POS1\rangle,\langle OBJ2,POS2\rangle \ldots \langle OBJm,POSm\rangle) \tag{1}$$

wherein m denotes the number of 2D objects identified, and OBJi and POSi (i=1, 2 . . . m) respectively represent a 2D object and its position. Each position may further be denoted by two-dimensional coordinates.

For example, for the picture 410, the result of executing Step 310 is OBJ1="blue color block", POS1=<x_411, y_411>, wherein <x_411,y_411> is the coordinates of the color block 411 in the picture 410. For the picture 420, the result of executing Step 310 is OBJ1="brown color block", POS1=<x_421,y_421>. And for the picture 430, the result of executing Step 310 is OBJ1="red color block", POS1=<x_431,y_431>; OBJ2="red color block", POS2=<x_432,y_432>.

Turning to FIG. 3, description is continued on subsequent steps following the Step 310.

To facilitate illustration, unless specifically provided, the picture 410 shown in FIG. 4 will be taken as the example of the picture in the following description of the subsequent steps. As described above, for the picture 410, the result of the execution of Step 310 is OBJ1="blue color block", POS1=<x_411,y_411>.

In Step 320, the three-dimensional model of the 3D object corresponding to the 2D object is obtained.

In accordance with an embodiment of the invention, the 3D object corresponding to the 2D object may be determined according to a predefined mapping relationship between 2D objects and 3D objects.

In accordance with an embodiment of the invention, in the case of the 2D object being a color block, the 3D object corresponding to a color block may be determined according to a predefined mapping relationship between colors of color blocks and 3D objects.

For example, the mapping relationship may be set in advance between colors of the color blocks and 3D objects, creating the following color-3D object mapping table (2):

$$\{<blue,lake>,<brown,boat, \ldots <red,human character>\} \quad (2)$$

wherein the two-tuple <blue, lake> denotes that "blue" corresponds to 3D object "lake". Similarly, the mapping table (2) also shows that "brown" corresponds to 3D object "boat" . . . and "red" corresponds to 3D object "human character".

For example, in Step 310, the 2D object in the picture 410 is recognized to be blue color block 411. According to the mapping table (2), it may be determined that the 3D object corresponding to the color block 411 is "lake". Similarly, it may be determined that the 3D object corresponding to the color block 421 in FIG. 4 is a "boat", and the 3D objects corresponding to the color blocks 431 and 432 are "human characters".

After the 3D object corresponding to the 2D object is determined, the model of the 3D object may be further identified. Typically, for a 3D object, there are often a plurality of corresponding models. For example, the 3D object "tree" shown in FIG. 2 may have multiple models to represent different species and/or appearance. The models of a 3D object may be individually created in advance and stored in a model database 785 (FIG. 7).

One or more models are automatically retrieved from a model database 785 based on the determined 3D object. This operation may be implemented in a way similar to that shown in FIG. 2. For example, a list window and an image library panel similar to the list window 240 and the image library panel 250 respectively may be displayed to the user, and in the list window one or more file names of models and their corresponding three-dimensional graphics are displayed for the user to determine. In response to the user's selection, a model is determined to be the model of 3D object corresponding to the 2D object model.

For example, after it is determined that the 3D object corresponding to the color block 411 is "lake", then a model representing "lake" may be determined in the above manner.

Figure 5:
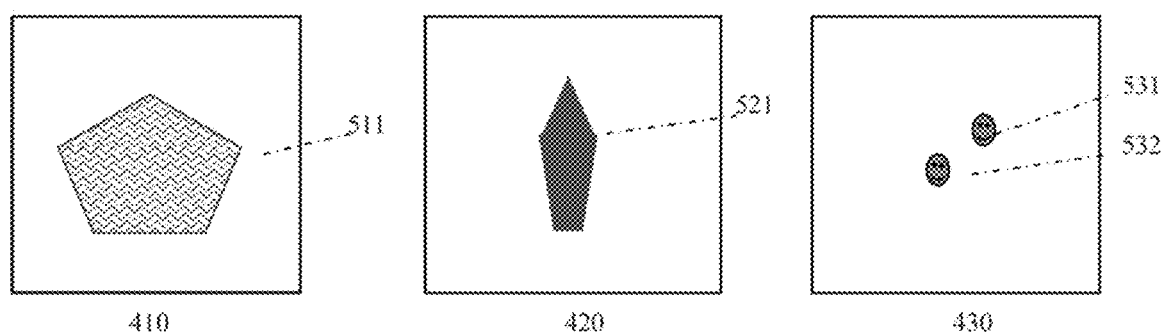
FIG. 5 schematically shows pictures evolved from the pictures as shown in FIG. 4.

The result of the execution of Steps 310 and 320 for the picture 410 is shown in FIG. 5, wherein the reference mark 511 denotes the model of the 3D object "lake" corresponding to the color block 411.

Of course, if the 2D object contained in the picture 410 is the pentagon 411a or the text block 411b, the model 511 of the 3D object "lake" may also be obtained in the same way. If Steps 310 and 320 are executed for the pictures 420 and 430, then the model 521 of the 3D object "boat" corresponding to the color block 421 in the picture 420 as well as the model 531 and 532 the 3D objects "human character" respectively corresponding to the 2D objects 431 and 432 in the picture 430 may be obtained. The model 531 and the model 532 may be the same, or they may not be the same, which can be determined by the user.

It should be noted that, although it is noted above that the model of the 3D object may be determined, after the 3D object corresponding to the 2D object is determined, in a way similar to that shown in FIG. 2; compared to the manner shown in FIG. 2, with the present invention, there is no need for the user to manually enter the search term for search the model database. And, as those skilled in the art shall appreciate, other methods may also be used to determine the model of the 3D object after the 3D object corresponding to the 2D object is determined.

It is also to be noted that the 2D object-3D object mapping table (2) described above is for the situation that the 2D object is a color block. For 2D objects of other forms, e.g. geometric graphics (e.g., 411a, 421a, 431a, 432a in FIG. 4) and text blocks (e.g., 411b), the mapping relationship between the 2D objects and the 3D objects may also be defined in advance in a similar way. For example, for the geometric graphics, the 2D object-3D object mapping table (3) may be defined in advance as the following:

$$\{<pentagon,lake>,<oval,boat>, \ldots <triangular,human characters>\} \quad (3)$$

Accordingly, those skilled in the art, when implementing the invention, may define this kind of relationship in accordance with their practice and choice.

In Step 330, the corresponding position of the 3D object corresponding to the 2D object in the horizontal plane of the 3D scene is calculated according to the position of the 2D object in the picture.

According to an embodiment of the invention, the coordinates of the position of the 3D object corresponding to the 2D object in the horizontal plane of the 3D scene may be calculated from the coordinates of the position of the 2D object in the picture based on the mapping relationship between the picture and an area of the horizontal plane of a 3D scene.

The mapping relationship between the picture and the horizontal surface area of and the 3D scene is defined in advance. For example, the picture 410 is a rectangle ABCD, and there is a pre-defined relationship between the picture 410 and the area of the horizontal plane of the 3D scene denoted by the reference mark 600. Specifically, the four points constituting the rectangle of the picture 410, namely, A, B, C and D are mapped to four points A', B', C' and D' in the horizontal plane of the 3D scene 600. The four points form a region 640, which is the region formed when the picture 410 is projected to the 3D scene 600.

As it will be described later with reference to FIG. 7, the mapping relationship between the picture and the horizontal region of the 3D scene may be stored in a mapping relationship database 783.

Based on the mapping relationship between the pictures 410 and the horizontal region 640 of the 3D scene 600, the point on the horizontal region 640 of the 3D scene 600 corresponding to a point of the picture may be derived.

Since the coordinates <x_411,y_411> of the position of the 2D object 411 in the picture 410 have been determined in Step 310, the proportional relationship between the picture 410 and the horizontal region 640 may be calculated according to the mapping relationship between the picture 410 and the horizontal region 640 of the 3D scene 600, and the coordinates <x_411',y_411'> in the horizontal plane of the 3D scene 600 corresponding to the coordinates <x_411, y_411> may be calculated. The calculated coordinates are the coordinates of the position of the 3D object corresponding to the 2D object 411 in the horizontal plane of the scene 600.

Similarly, the coordinates <x_421',y_421'> of the position of the 3D object corresponding to the 2D object 421 in the picture 420 in the horizontal plane of the scene 600 may be calculated. The coordinates of the positions of the 3D objects corresponding to the 2D objects 431 and 432 in the picture 430 in the horizontal plane of the scene 600 are <x_431',y_431'> and <x_432',y_432'>, respectively.

The operation of Step 320 and Step 330 of the method shown in FIG. 3 is described above. It should be noted that the execution of Step 320 and Step 330 is not restricted to a specific precedence relationship; in other words, Step 330 may be performed before Step 320 or vice versa, or the two steps may be performed simultaneously.

After the above steps, the process proceeds to Step 340.

In Step 340, the falling of the model of the 3D object onto the 3D scene from a predetermined height above the 3D scene is simulated, wherein the position of the landing point of the model of the 3D object in the horizontal plane is the corresponding position of the 3D object in the horizontal plane of the 3D scene.

According to an embodiment of the present invention, said simulating the falling of the model of the 3D object onto the 3D scene from a predetermined height above the 3D scene comprises simulating the model of the 3D object to remain on the virtual object in the 3D scene which collided during the falling.

According to an embodiment of the present invention, said predetermined height is a predetermined height associated with the picture. That is, different pictures may be associated with different predetermined heights.

Figure 6:
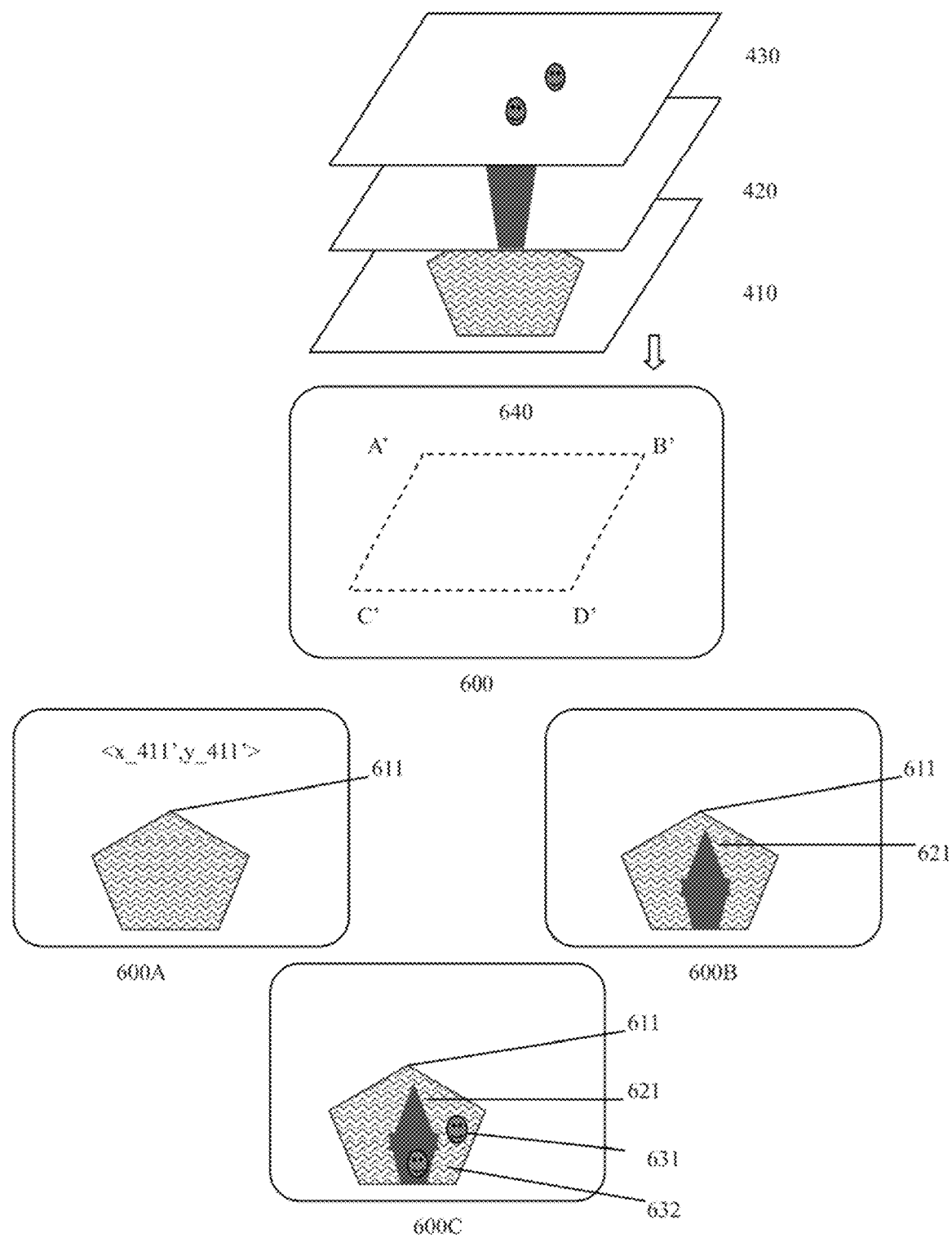
FIG. 6 schematically shows the process of putting 31) objects to a 3D scene by manipulating pictures in accordance with an embodiment of the present invention.

As shown in FIG. 6, assume that initially the 3D scene 600 in which 3D object models are to be placed 600 is only blank ground. At this time, it is to simulate the falling of the model of the 3D object corresponding to the 2D object in the picture 410 from a predetermined height above the 3D scene.

Previously, at Step 310, it is identified that there is only one 2D object 411 in the picture 410. In Step 320, the model 511 of the 3D object "lake" corresponding to the 2D object 411 is obtained. And in Step 330, the position of the 3D object "lake" corresponding to the 2D object 411 in the horizontal plane of the 3D scene 600, e.g., the coordinates <x_411',y_411'>, is calculated.

Therefore, Step 340 simulates the falling or landing process of the model 511 of the 3D object "lake" to cause the model 511 to land on the 3D scene 600, so that the 3D scene 600 becomes the 3D scene 600A. In the process, the model 511 of the 3D object "lake" falls onto the blank ground and is rendered as a three-dimensional graphic 611, and the position of its landing point in the horizontal plane is the position of the 3D object "lake" in the horizontal plane of the 3D scene 600 as calculated in Step 330, e.g., the coordinates <x_411',y_411'>.

Subsequent to the execution of Steps 310-340 for the picture 410, Steps 310-340 are performed for the picture 420. In Step 310, it is identified that there is only one 2D object 421 in the picture 420. In Step 320, the model 521 of the 3D object "boat" corresponding to the 2D object 421 is obtained. And in Step 330, the position of the 3D object "boat" corresponding to the 2D object 421 in the horizontal plane of the 3D scene 600, e.g., the coordinates <x_421',y_421'>, is calculated.

In Step 340, the falling or landing process of the model 521 of the 3D object "boat" is simulated to cause the model 521 to land on the 3D scene 600A, wherein the 3D object "boat" is landed onto the three-dimensional graphic "lake" is rendered as a three-dimensional graphic 621, and the position of its landing point in the horizontal plane is the position of the 3D object "boat" in the horizontal plane of the 3D scene 600 as calculated in Step 330, e.g., the coordinates <x_421',y_421'>. After the completion of Step 340, the 3D scene 600A becomes the 3D scene 600B.

Subsequent to the execution of Steps 310-340 for the picture 420, Steps 310-340 are performed for the picture 430. In Step 310, it is identified that there are two 2D objects 431 and 432 in the picture 430.

In Step 320, the models 531 and 532 of the 3D objects "human character" corresponding to the 2D objects 431 are obtained. And in Step 330, the position of the 3D objects "human character" corresponding to the 2D objects 431 and 432 in the horizontal plane of the 3D scene 600, e.g., the coordinates <x_431',y_431'> and <x_432',y_432'>, are calculated.

In Step 340, the falling or landing process of the models 531 and 532 of the 3D object "human character" is simulated to cause the models 531 and 532 to land on the 3D scene 600B, wherein the model 531 of the 3D object "human character" lands onto the three-dimensional graphics 611 of "lake" and is rendered as a three-dimensional graphic 631, and the position of its landing point in the horizontal plane is the position of the 3D object "human character" in the horizontal plane of the 3D scene 600 as calculated in Step 330, e.g., the coordinates <x_431',y_431'>. The model 532 of the 3D object "human character" corresponding to the 2D object 432 is landed onto the three-dimensional graphics 621 of "boat" and is rendered as a three-dimensional graphics 632, and the coordinates of the position of its landing point in the horizontal plane is <x_431',y_431'>. After the completion of Step 340, the 3D scene 600A becomes the 3D scene 600B.

It should be noted that the model 531 and 532 of the 3D objects "human character" corresponding respectively to the 2D objects 431 and 432 may be identical or may not be identical. As mentioned in the description of Step 330, the different styles of the model 531 and model 532 may be determined in response to the user's selection.

After the completion of Step 340, the 3D scene 600B becomes 3D scene 600C.

From the above, it may be seen that a complex three-dimensional virtual scene may be created by repeating the above process for different pictures according to a certain order.

In implementing the invention, during the process of the 3D scene 600 being evolved to the 3D scene 600A, 600B and 600C, the position, direction and size of the virtual objects in the 3D scene 600A, 600B and 600C may be adjusted at any time. And the 3D scene 600A, 600B and 600C may also be saved in the 3D scene database 787 (FIG. 7) in the form of image files. Such applications like the virtual world application 790 (FIG. 7) may read these image files from the 3D scene database 787 and display the corresponding 3D scenes in a three-dimensional virtual system.

The method for generating a three-dimensional virtual scene according to various embodiments of the invention has been described. According to the inventive concepts, the invention also provides a system for generating a three-dimensional virtual scene.

FIG. 7 schematically shows a block diagram of the system 700 for generating a three-dimensional virtual scene in accordance with an embodiment of the invention.

As shown in the FIG. 7, the system 700 comprises a 2D object identifying device 710, a model acquiring device 720, a position mapping means 730, and a simulation device 740.

The 2D object identifying device 710 is configured to recognize/identify a two-dimensional object in a 2D picture and the position of the 2D object in the 2D picture.

The model acquiring means 720 is configured to obtain the three-dimensional model of a 3D object corresponding to the 2D object.

The position mapping means 730 is configured to calculate the corresponding position of the 3D object corresponding to the 2D object in the horizontal plane of the 3D scene according to the position of the 2D object in the picture.

The simulation device 740 is configured to simulate the falling of the model of the 3D object onto the 3D scene from a predetermined height above the 3D scene, wherein the position of the landing point the model of the 3D object in the horizontal plane is the corresponding position of the 3D object in the horizontal plane of the 3D scene.

In accordance with an embodiment of the invention, the model acquiring device 730 is further configured to determine the 3D object corresponding to the 2D object according to a predefined mapping relationship between 2D objects and 3D objects.

As indicated in the description of the method Step 330 in connection with FIG. 3 in the above, the predefined 2D object-3D object mapping relationship may be stored in a mapping relationship DB (database) 783. The model acquiring device 730 may read the 2D object-3D object mapping relationship from the mapping relationship DB 783.

In accordance with an embodiment of the present invention, the model acquiring device 730 is further configured to retrieve one or more models from a model database based on the determined 3D object corresponding to the 2D object, and determine a model of the 3D object corresponding to the 2D object in response to a user's selection.

According to an embodiment of the invention, the position mapping device 720 is further configured to calculate the coordinates of the position of the 3D object corresponding to the 2D object in the horizontal plane of the 3D scene from the coordinates of the position of the 2D object in the picture based on the mapping relationship between the picture and an area of the horizontal plane of the 3D scene.

The mapping relationship between the picture and the area or region of the horizontal plane of the 3D scene is established in advance. For example, the mapping relationship between the picture and the area or region of the horizontal plane of the 3D scene may be established by a mapping relationship setting device 774, and data of the mapping relationship may be stored in a database, e.g., the mapping relationship database 783 shown in the FIG. 7. The position mapping device may read the mapping relationship between the picture and the area or region of the horizontal plane of the 3D scene from the mapping relationship database 783.

According to an embodiment of the invention, the 2D object in the picture mentioned in the above is a color block.

Accordingly, according to an embodiment of the invention, the 2D object identifying device is further configured to identify a color block, and the color and the position of the color block; and the model acquiring device is further configured to determine the 3D object corresponding to the 2D object based on the predefined color-3D) object mapping relationship.

Similarly, the color-3D object mapping relationship may be defined by a mapping relationship setting device 774 in advance, and data of the color-3D object mapping relationship may be stored in the mapping relationship database 783. The 2D object identifying device 710 may read the data of the color-3D) object mapping relationship from mapping relationship database 783 according to needs.

In accordance with an embodiment of the present invention, the 2D object identifying device is further configured to calculate the coordinates of the geometric center of the color block in the picture to represent the coordinates of the position of the color block in the picture.

In accordance with an embodiment of the invention, the simulation device 740 is further configured to simulate the model of the 3D object to remain on the virtual object in the 3D scene collided during the falling.

In accordance with an embodiment of the invention, the predefined height is a height in association with the picture.

In accordance with an embodiment of the invention, the picture may be created in advance by a tool for generating 2D pictures such as the picture editor 772, and the created picture may be stored in a picture database 781. In implementing the invention, a picture inputting device 750 may be employed to read pictures from the picture editor 772 or the picture database 781 as the input data of the 2D object identifying device 710.

The above has described on the system for generating three-dimensional virtual scene according to embodiments of the present invention. Because the method for generating three-dimensional virtual scene according to embodiments of the present invention has been described in detail, in the above, the description of the system omits the content that repeats or may readily be derived from the description of the method.

It should be noted that the above depiction is only exemplary, not intended for limiting the present invention. In other embodiments of the present invention, this method may have more, or less, or different steps, and numbering the steps is only for making the depiction more concise and much clearer, but not for stringently limiting the sequence between each steps, while the sequence of steps may be different from the depiction.

Therefore, in some embodiments, the above one or more optional steps may be omitted. Specific embodiments of each step may be different from the depiction. All these variations fall within the spirit and scope of the present invention.

The present invention may adopt a form of hardware embodiment, software embodiment or an embodiment comprising hardware components and software components. In a preferred embodiment, the present invention is implemented as software, including, without limitation to, firmware, resident software, micro-code, etc.

Moreover, the present invention may be implemented as a computer program product usable from computers or accessible by computer-readable media that provide program code for use by or in connection with a computer or any instruction executing system. For the purpose of description, a computer-usable or computer-readable medium may be any tangible means that can contain, store, communicate, propagate, or transport the program for use by or in connection with an instruction execution system, apparatus, or device.

The medium may be an electric, magnetic, optical, electromagnetic, infrared, or semiconductor system (apparatus or device), or propagation medium. Examples of the computer-readable medium would include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

A data processing system adapted for storing or executing program code would include at least one processor that is coupled to a memory element directly or via a system bus. The memory element may include a local memory usable during actually executing the program code, a mass memory, and a cache that provides temporary storage for at least one portion of program code so as to decrease the number of times for retrieving code from the mass memory during execution.

An Input/Output or I/O device (including, without limitation to, a keyboard, a display, a pointing device, etc.) may be coupled to the system directly or via an intermediate I/O controller.

It is to be understood from the foregoing description that modifications and alterations may be made to the respective embodiments of the present invention without departing from the true spirit of the present invention. The description in the present specification is intended to be illustrative and not limiting. The scope of the present invention is limited by the appended claims only.

It is to be understood from the foregoing description that modifications and alterations may be made to the respective embodiments of the present invention without departing from the true spirit of the present invention. The description in the present specification is intended to be illustrative and not limiting. The scope of the present invention is limited by the appended claims only.

The invention claimed is:

1. A method for generating a three-dimensional (3D) virtual scene, comprising:
    identifying a two-dimensional (2D) object in a 2D picture of any of a plurality of picture types and a position of the 2D object in the 2D picture, the plurality of picture types including every type of picture with individually recognizable 2D objects;
    obtaining a three-dimensional model of a 3D object corresponding to the 2D object based on a mapping relationship between positions and colors of color blocks in the 2D object and the 3D object, the colors being any of a plurality of colors in the visible spectrum;
    calculating a corresponding position of the 3D object corresponding to the 2D object in a horizontal plane of the 3D scene according to the position of the 2D object in the 2D picture based on a mapping relationship determined between the 2D picture and an area of the horizontal plane of the 3D scene; and
    simulating a falling of the model of the 3D object onto the 3D scene from a predetermined height above the 3D scene, wherein the position of the landing point of the model of the 3D object in the horizontal plane is the corresponding position of the 3D object in the horizontal plane of the 3D scene.

2. The method according to claim 1, wherein said obtaining the three-dimensional model of the 3D object corresponding to the 2D object further comprises:
    determining the 3D object corresponding to the 2D object according to a predefined mapping relationship between 2D objects and 3D objects.

3. The method according to claim 2, wherein said obtaining the three-dimensional model of the 3D object corresponding to the 2D object further comprises:
    retrieving one or more models from a model database based on the determined 3D object corresponding to the 2D object, and determining a model of the 3D object corresponding to the 2D object in response to a user's selection.

4. The method according to claim 1, wherein said calculating the corresponding position of the 3D object corresponding to the 2D object in the horizontal plane of the 3D scene according to the position of the 2D object in the picture further comprises:
    calculating the coordinates of the position of the 3D object corresponding to the 2D object in the horizontal plane of the 3D scene from coordinates of the position of the 2D object in the picture based on the mapping relationship between the picture and an area of the horizontal plane of the 3D scene.

5. The method according to claim 1, wherein the 2D object in the picture is a color block.

6. The method according to claim 5, wherein said identifying a two-dimensional (2D) object in a 2D picture and the position of the 2D object in the 2D picture further comprises:
    identifying a color block, a color and a position of the color block; and said obtaining the three-dimensional model of the 3D object corresponding to the 2D object, further comprises:
    determining the 3D object corresponding to the 2D object based on the predefined color-3D object mapping relationship.

7. The method according to claim 6, wherein said identifying a color block, a color and a position of the color block further comprises:
    calculating the coordinates of a geometric center of the color block in the picture to represent coordinates of the position of the color block in the picture.

8. The method according to claim 1, wherein said simulating a falling of the model of the 3D object onto the 3D scene from a predetermined height above the 3D scene comprises simulating the model of the 3D object to remain on the virtual object in the 3D scene encountered during the falling.

9. The method according to claim 1, wherein said predefined height is a height associated with the picture.

10. The method according to claim 1, wherein said picture is generated in advance using a tool for generating 2D pictures.

11. A system for generating a three-dimensional (3D) virtual scene, comprising:
    a 2D object identifying device, configured to identify a two-dimensional (2D) object in a 2D picture and a position of the 2D object in the 2D picture, the 2D picture being any of a plurality of picture types with individually recognizable 2D objects;
    a model acquiring device, configured to obtain a three-dimensional model of a 3D object corresponding to the 2D object based on a mapping relationship between colors of color blocks in the 2D object and the 3D object, the colors being any of a plurality of colors in the visible spectrum;
    a position mapping device, configured to calculate a corresponding position of the 3D object corresponding to the 2D object in a horizontal plane of the 3D scene according to the position of the 2D object in the 2D picture based on a mapping relationship determined between the 2D picture and an area of the horizontal plane of the 3D scene; and a simulation device, configured to simulate a falling of the model of the 3D object onto the 3D scene from a predetermined height above the 3D scene, wherein the position of a landing point of the model of the 3D object in the horizontal plane is a corresponding position of the 3D object in the horizontal plane of the 3D scene.

12. The system according to claim 11, wherein the model acquiring device is further configured to determine the 3D object corresponding to the 2D object according to a predefined mapping relationship between 2D objects and 3D objects.

13. The system according to claim 12, wherein the model acquiring device is further configured to retrieve one or more models from a model database based on the determined 3D object corresponding to the 2D object, and determine a model of the 3D object corresponding to the 2D object in response to a user's selection.

14. The system according to claim 11, wherein said position mapping device is further configured to calculate the coordinates of the position of the 3D object corresponding to the 2D object in the horizontal plane of the 3D scene from the coordinates of the position of the 2D object in the picture based on the mapping relationship between the picture and an area of the horizontal plane of the 3D scene.

15. The system according to claim 11, wherein the 2D object in the picture is a color block.

16. The system according to claim 15, wherein the 2D object identifying device is further configured to identify a color block, and a color and a position of the color block; and the model acquiring device is further configured to determine the 3D object corresponding to the 2D object based on the predefined color-3D object mapping relationship.

17. The system according to claim 16, wherein the 2D object identifying device is further configured to calculate coordinates of the geometric center of the color block in the picture to represent the coordinates of the position of the color block in the picture.

18. The system according to claim 11, wherein the simulation device is configured to simulate the model of the 3D object to remain on the virtual object in the 3D scene encountered during the falling.

19. The system according to claim 11, wherein the predefined height is a height in association with the picture.

20. The system according to claim 11, wherein the picture is generated in advance using a tool for generating 2D pictures.

* * * * *